United States Patent
Stewart et al.

(10) Patent No.: US 11,676,111 B1
(45) Date of Patent: Jun. 13, 2023

(54) APPARATUSES AND METHODS FOR DETERMINING AND PROCESSING DORMANT USER DATA IN A JOB RESUME IMMUTABLE SEQUENTIAL LISTING (71) Applicant: MY JOB MATCHER, INC., Austin, TX (US)

(72) Inventors: Arran Stewart, Austin, TX (US); Steve O'Brien, Raleigh, NC (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 17/851,249

(22) Filed: Jun. 28, 2022

Related U.S. Application Data (63) Continuation of application No. 17/582,104, filed on Jan. 24, 2022, now Pat. No. 11,416,821.

(51) Int. Cl.
G06Q 10/1053 (2023.01)
G06F 21/60 (2013.01)
G06F 16/23 (2019.01)

(52) U.S. Cl.
CPC ..... G06Q 10/1053 (2013.01); G06F 16/2365 (2019.01); G06F 21/602 (2013.01)

(58) Field of Classification Search
CPC ............ G06Q 10/1053; G06F 16/2365; G06F 21/602
See application file for complete search history.

(56) References Cited

U.S. PATENT DOCUMENTS

| 10,567,388 | B1* | 2/2020 | Kruse | H04L 63/10 |
| 11,416,821 | B1* | 8/2022 | Stewart | G06F 21/602 |
| 11,507,901 | B1* | 11/2022 | Stewart | G06Q 10/063112 |
| 2010/0005124 | A1* | 1/2010 | Wagner | G06F 16/27 707/E17.007 |
| 2013/0332919 | A1* | 12/2013 | Emejulu | G06F 8/61 717/174 |
| 2022/0012672 | A1* | 1/2022 | Inman | G06F 21/32 |

* cited by examiner

Primary Examiner — Henry Tsai
Assistant Examiner — John B Roche
(74) Attorney, Agent, or Firm — Caldwell Intellectual Property Law (57) ABSTRACT Aspects relate to apparatuses and methods for determining and processing dormant data records on an immutable sequential listing. An exemplary apparatus includes a processor configured to monitor a plurality of timestamps associated with a plurality of data records stored on the immutable sequential listing, where the data record includes a job resume, detect inactivity in a first data record of the plurality of data records over a predetermined time period as a function of a first timestamp of the first data record, wherein the predetermined time period may be set by the user, tag, as a function of the inactivity, the first data record as an inactive first data record, and process, as a function inactivity, the first data record, wherein processing may include adding additional data or archiving inactive data records from the immutable sequential listing.

18 Claims, 5 Drawing Sheets

APPARATUSES AND METHODS FOR DETERMINING AND PROCESSING DORMANT USER DATA IN A JOB RESUME IMMUTABLE SEQUENTIAL LISTING

CROSS-REFERENCE TO RELATED APPLICATIONS

This application is a continuation of Nonprovisional application Ser. No. 17/582,104, filed on Jan. 24, 2022, and entitled "APPARATUSES AND METHODS FOR DETERMINING AND PROCESSING DORMANT USER DATA IN A JOB RESUME IMMUTABLE SEQUENTIAL LISTING," the entirety of which is incorporated herein by reference.

FIELD OF THE INVENTION

The present invention relates to the field data collection and processing. In particular, the present invention is directed to apparatuses and methods for identifying dormant user data on an immutable sequential listing and archiving stale data from the immutable sequential listing BACKGROUND Immutable sequential listings are a wonderful way to securely upload and store resumes or sensitive information of jobseekers for job matching purposes. However, a maintenance problem arises when inactive job seekers information remains on the listings for employment matching.

SUMMARY OF THE DISCLOSURE

In an aspect, an apparatus for determining dormant user data stored on an immutable sequential listing is provided. The apparatus includes at least a processor. The apparatus also includes a memory communicatively connected to the at least a processor. The memory contains instructions configuring the at least a processor to detect inactivity in a first data record of a plurality of data records of an immutable sequential listing over a predetermined time period as a function of a first timestamp of the first data record, tag, as a function of the inactivity, the first data record as an inactive first data record, and transmit a notification of the inactivity to a remote user device.

In another aspect, a method for determining dormant data stored on an immutable sequential listing is provided. The method includes detecting, using a processor, inactivity in a first data record of a plurality of data records of an immutable sequential listing over a predetermined time period as a function of a first timestamp of the first data record. The method includes tagging, using the processor, the first data record as an inactive first data record as a function of the inactivity. The method includes transmitting a notification of the inactivity to a remote user device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for determining dormant user data. In an embodiment, data records may be a job resume.

Aspects of the present disclosure can be used to detect inactive users of a job matching website. Aspects of the present disclosure can also be used to archive dormant user data from the immutable sequential listing. Apparatuses and methods for determining dormant user data may allow employers, job seekers, and job matching services to work more fluidly in use of job matching services.

In an embodiment, methods and apparatuses described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2n/2)$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

In some embodiments, apparatuses and methods described herein may generate, evaluate, and/or utilize digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature. A third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Figure 1:
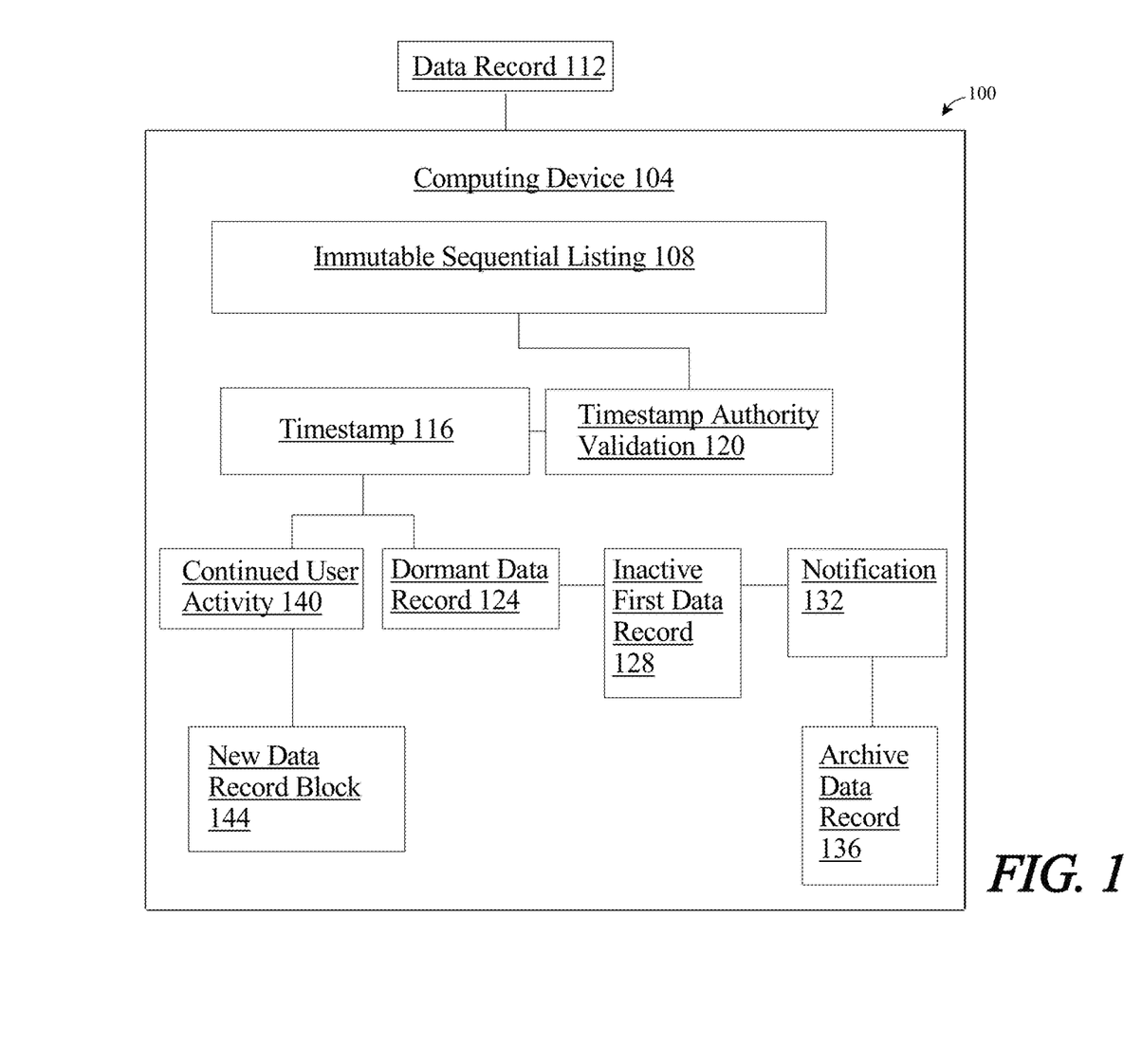
FIG. 1 is a block diagram illustrating an exemplary embodiment of an apparatus for determining dormant data records.

Referring now to FIG. 1, an exemplary embodiment of an apparatus 100 for determining and processing dormant user data. Apparatus 100 may include a processor communicatively connected to computing device 104. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 is configured to determine dormant data records 112 stored on an immutable sequential listing 108. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. As used in this disclosure a "data record" is a record containing one or more data elements within an immutable sequential listing, where "within" indicates recordation within an immutable sequential listing, including entry of a representation using a hash, cryptographic accumulator, or other element of data representing the data record, for instance and without limitation as described in further detail below. In some cases, data record 112 may include user's resume or profile, which may be in video, visual, audio and/or text format, a cover letter and other information relating to the applicant's education, experience (professional, work, personal), qualifications, interests, and the like, among others. As used in this disclosure, "user" may be a jobseeker or applicant, an administrator (e.g. apparatus administrator of the immutable sequential listing network), or a professional reference. Computing device 104 is configured to detect inactivity in first data record 112 of the plurality of data records over a predetermined time period as a function of first timestamp 116 of first data record 112. As used in this disclosure, "inactivity" is the lack of additional blocks added to the immutable sequential listing with an updated timestamp of a data record over a period of time. As used in this disclosure, a "timestamp" is an element of data stored in each block as a unique serial and whose main function is to determine the exact moment in which the block has been mined and validated by the immutable sequential listing network. Timestamp 116 proves and/or may be used to demonstrate that an element of data including and/or associated with the timestamp existed when generated, when a block was published and/or hashed, or the like. Timestamps may include date stored in each block or data record as indicative of a date/time of block and/or entry creation, modification and/or validation. In some embodiments, data record 112 may be a job applicant's data record. In such a case, timestamp 116 may be indicative of the last time user updated his resume, profile, and other associated information on the immutable sequential listing network. In some cases, detecting inactivity may include noting that no activity associated with data record 112 has occurred over a certain time period (e.g., 6 months). The predetermined time period may be set to a default value, or it may be selectable by a user or the like. For example, a user may set this time period for 12 months when creating an account on immutable sequential listing 108. The predetermined time period may also be alterable or adjustable by user.

With continued reference to FIG. 1, in some embodiments, computing device 104 may be configured to run as a full node to monitor a plurality of timestamps associated with a plurality of data records stored on an immutable sequential listing to determine dormant user data. A full node is a device (like a computer) that contains a full copy of the transaction history of the immutable sequential listing. Nodes can be any kind of device (mostly computers, laptops or even bigger servers). Nodes form the infrastructure of an immutable sequential listing. All nodes on an immutable sequential listing are connected to each other through a network and they constantly exchange the latest immutable sequential listing data with each other so all nodes stay up to date.

With continued reference to FIG. 1, in some embodiments, computing device 104 may be configured to validate timestamp 116 at timestamp authority 120 (TSA). In some embodiments, validating timestamp 116 may involve utilization of trusted timestamping. As used in this disclosure, "trusted timestamping" is the process of securely keeping track of the creation and modification time of a data record or other element of data. Security here means that no one—not even the owner of the record—is able to change it once it has been recorded provided that the time stamper's integrity is never compromised. The administrative aspect involves setting up a publicly available, trusted timestamp management infrastructure to collect, process, and renew timestamps. As used in this disclosure, a "timestamp authority" is a trusted third party (TTP) entity that issues a timestamp. TTP facilitates interactions between two parties who both trust the third party; the Third Party reviews all critical transaction communications between the parties, based on the ease of creating fraudulent digital content. Anyone trusting the TTP can then verify that the record was not created after the date that the TTP vouches. It can also no longer be repudiated that the requester of the timestamp was in possession of the original data at the time given by the timestamp. To prove this, for example, computing device 104 may calculate the hash of the original data record, the timestamp given by TSA 120 is appended to it and the hash of the result of this concatenation is calculated, call this hash A. Then computing device 104 would validate the digital signature of TSA 120 by decrypting the digital signature using public key of TSA, producing hash B. Computing device 104 would then compare Hash A with hash B inside the signed TSA 120 message to confirm they are equal, proving that timestamp 116 and message is unaltered and was issued by the TSA. If not, then either timestamp 116 was altered or timestamp 116 was not issued by TSA 120.

Still referring to FIG. 1, computing device 104 may use secure proofs to validate data record timestamp 116. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

With continued reference to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof, for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 1, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof Persons skilled in the art, upon reviewing the entirety of this disclosure, will be aware of various forms of zero-knowledge proofs that may be used, singly or in combination, consistently with this disclosure.

With continued reference to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, computing device 104 is configured to tag 128, as a function of the inactivity, first data record 124 as inactive first data record 128. As used in this disclosure, "tagging" is labeling or marking inactive data record 124 stored on immutable sequential listing 108. In some cases, tagging inactive user date record 124 includes labeling the record as at least "inactive" for the purpose of flagging for further action. For example, computing device 104 may register that first data record 112 has not been updated by the addition of more blocks, holding updated data of the first data record with an updated timestamp 116, has not been added to immutable sequential listing 108 over a 6-month period of time. Computing device 104 may tag this inactivity by adding a new block to the immutable sequential listing containing first data record 112, labeling the data in the new block as inactive. In some embodiments, computing device 104 may be configured to transmit, as a function of tagging, notification 132 to a remote device, such as, and without limitation, a remote device operated by a first user associated with first data record 128. In some cases, the transmission of notification 132 to the first user is conducted by electronic means consisting of at least email. Similarly, the notification (or alert) to the user may involve a text message, voice call, and the like, among others. A link may be provided in notification 132 to sign into their immutable sequential listing account. The user may also be prompted for a response to notification 132. Suitable language, as needed or desired, may be included within notification 132. Notification 132 may issue to multiple users, for example, an administrator may be copied on an email to the jobseeker or applicant.

With continued reference to FIG. 1, computing device 104 is configured to process, as a function of time elapsed from the time of notification 132 and response from the first user to notification 132, first data record 128. Processing of data record 112 may include any procedure for modification of data record and/or a status thereof within apparatus. For example, if data record 128 has been inactive for a long time period, data record 128 may be archived 136 on a separate data record 136 from immutable sequential listing 108. Another option, when the user is not responsive to notification 132, could be to send a predetermined number of time-spaced notifications 132 to the user prior to any archiving 136 of data record 128. In some cases, the user may respond to notification 132 and update their data record and/or provide additional information. In some embodiments, computing device 104 may receive user indication of continued activity 140 and be configured to post new data record block 144 with updated timestamp 116 on immutable sequential listing 108. In some embodiments, computing device 104 may also receive new data records to add to immutable sequential listing 108.

Figure 2:
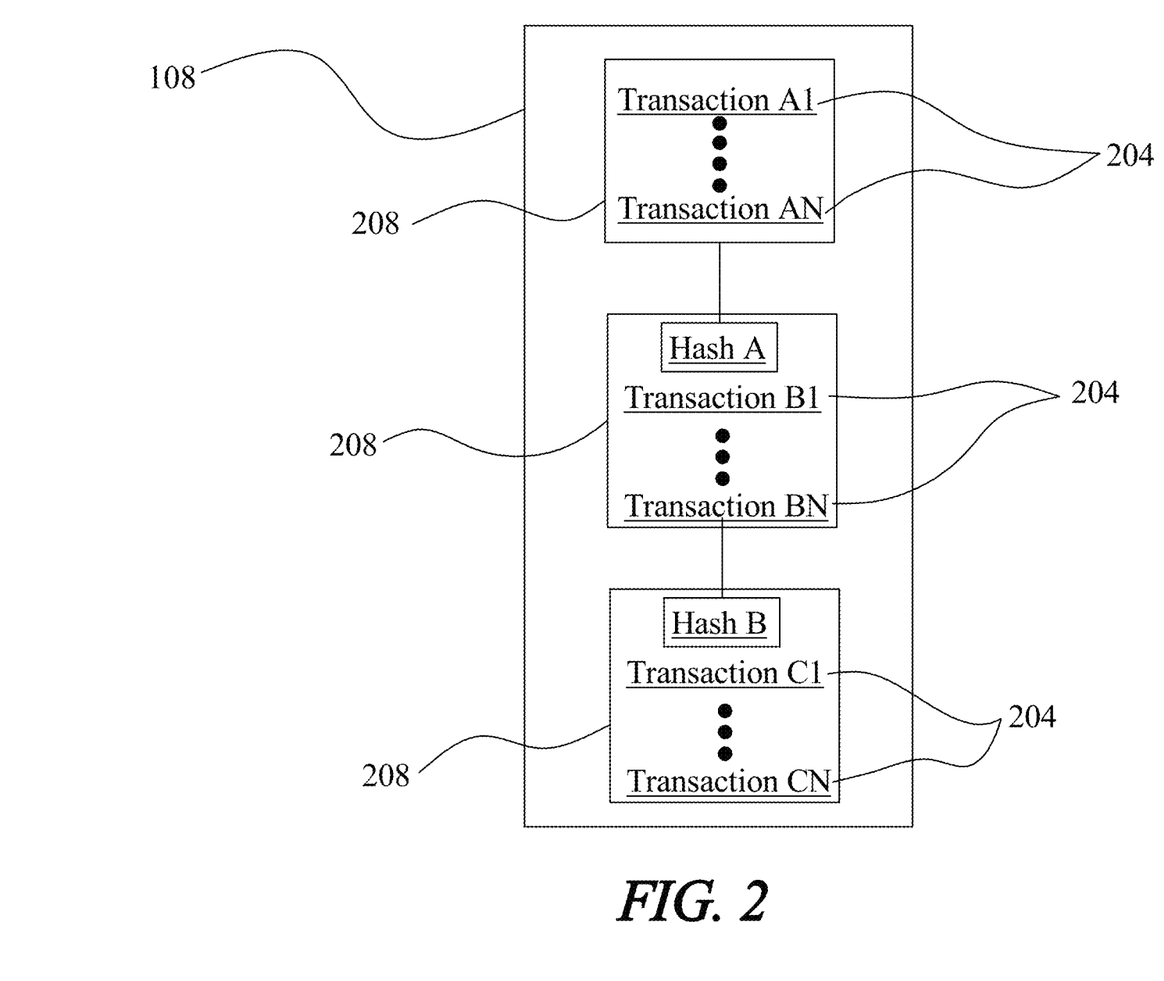
FIG. 2 is a block diagram illustrating an exemplary embodiment of an immutable sequential listing.

Referring now to FIG. 2, an exemplary embodiment of an immutable sequential listing 108 is illustrated. An immutable sequential listing may be, include and/or implement an immutable ledger, where data entries that have been posted to the immutable sequential listing cannot be altered. Data elements are listing in immutable sequential listing 108; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 108 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 108 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 108 may preserve the order in which the at least a posted content took place by listing them in chronological order; alternatively or additionally, immutable sequential listing 108 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 108 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 108 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 108, once formed, may be inalterable by any party, no matter what access rights that party possesses. For instance, immutable sequential listing 108 may include a hash chain, in which data is added during a successive hashing process to ensure non-repudiation. Immutable sequential listing 108 may include a block chain. In one embodiment, a block chain is immutable sequential listing 108 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 108 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208. Each sub-listing 208 created in immutable sequential listing 108 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 108 may develop a fork; protocol may determine which of the two alternate branches in the fork is the valid new portion of the immutable sequential listing 108 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 108 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 108.

Still referring to FIG. 2, additional data linked to at least a posted content may be incorporated in sub-listings 208 in the immutable sequential listing 108; for instance, data may be incorporated in one or more fields recognized by block chain protocols that permit a person or computer forming a at least a posted content to insert additional data in the immutable sequential listing 108. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a posted content as described above.

Figure 3:
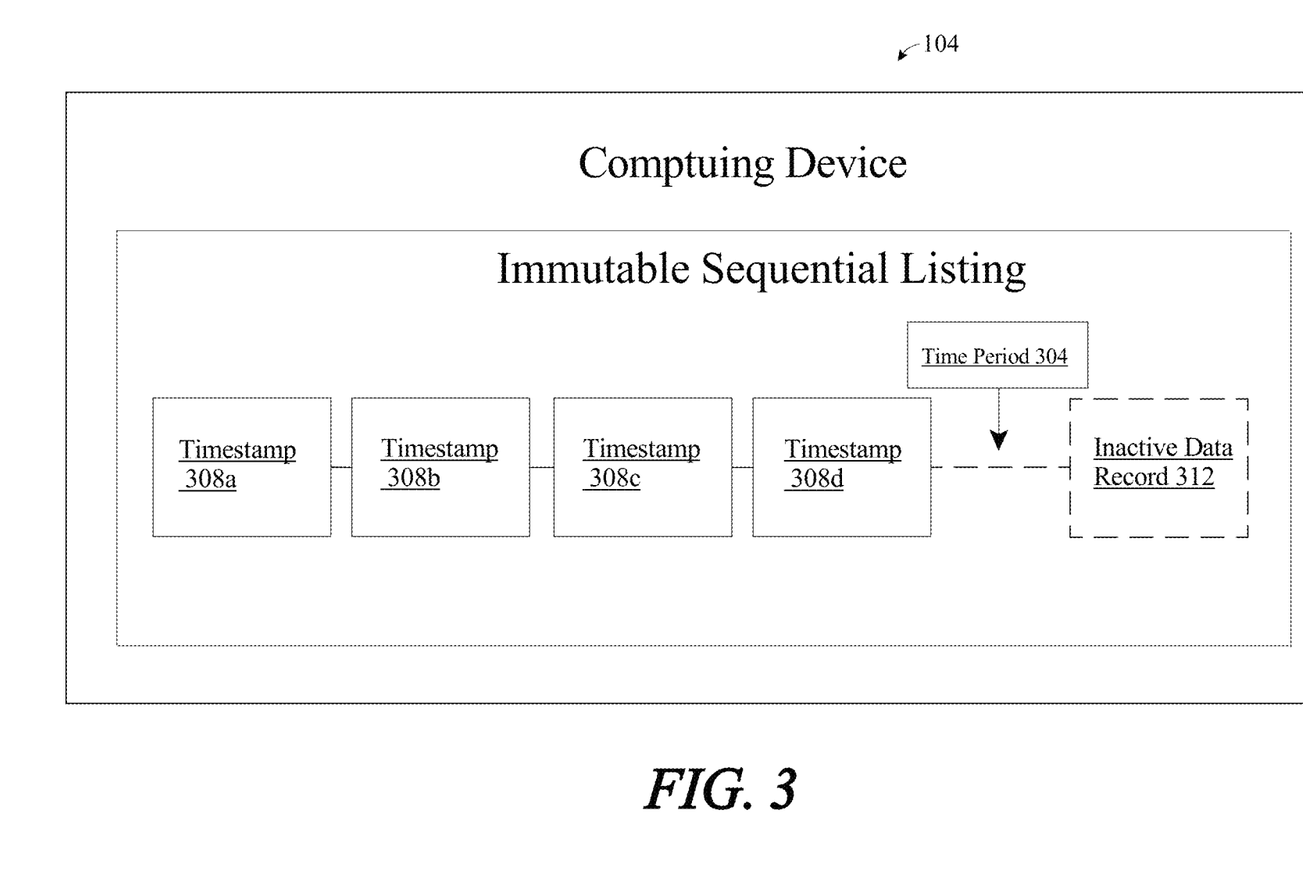
FIG. 3 is a process flow diagram illustrating an exemplary embodiment of tagging dormant data records.

Referring now to FIG. 3, a process flow diagram illustrating an exemplary embodiment of computing device 104 tagging inactive first data record 112. In some embodiments, predetermined time period 304 (e.g., 6 months) may be set by user before computing device 104 flags data records and tags as inactive. For example, computing device 104 may monitor a plurality of timestamps, timestamps 308a-d associated with the first data record, recording that each new block of the first user added to immutable sequential listing 108 has a timestamp changed within the predetermined time period set by the user. When computing device detects that the latest timestamp, timestamp 308d, has not changed over within the time period, 6 months, it may then tag the data record of the first user as inactive by adding new block 312 to the listing labeling the data as inactive.

Figure 4:
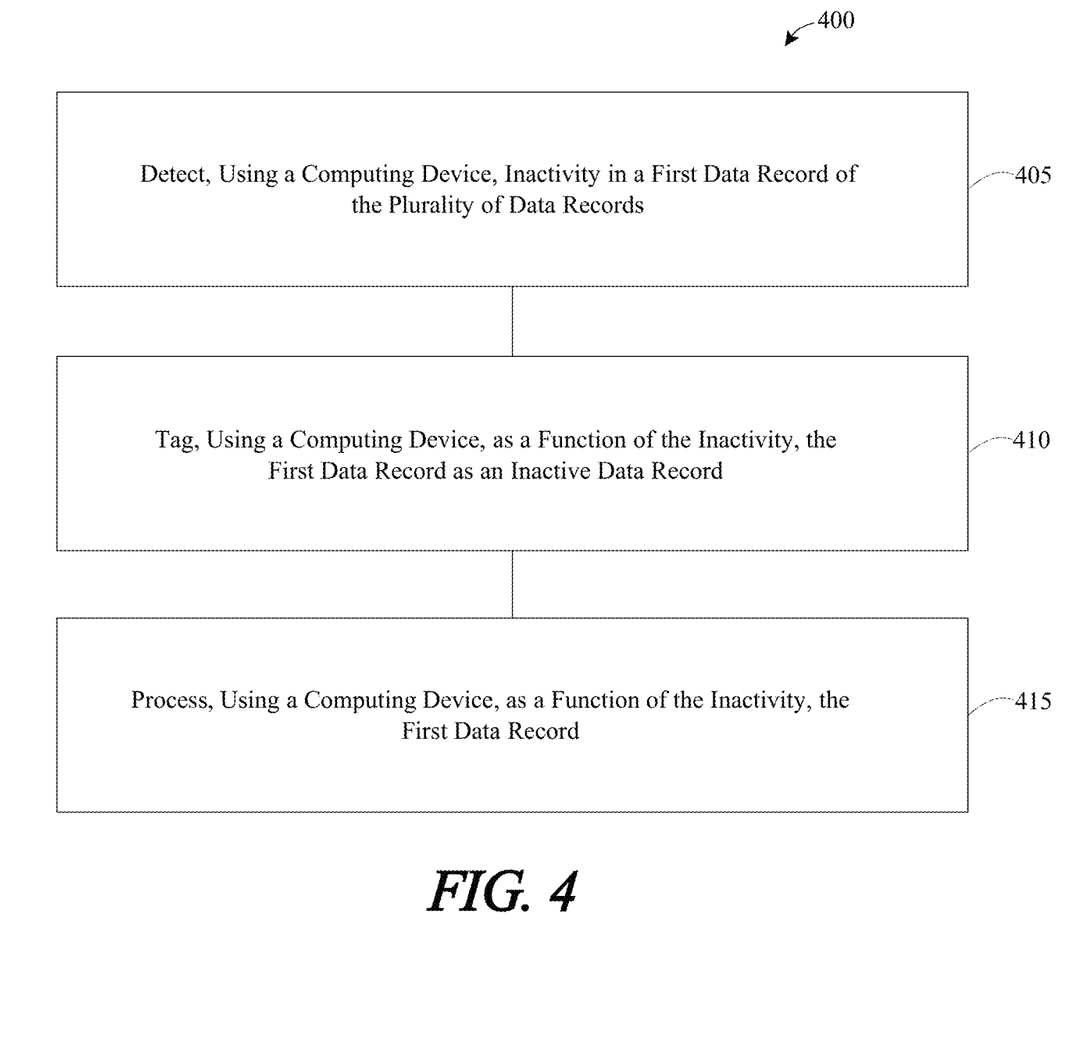
FIG. 4 is a flow diagram illustrating an exemplary embodiment of a method for determining dormant data records.

Referring now to FIG. 4, a flow diagram of an overview of an exemplary embodiment of a method 400 for, using a computing device, detecting and processing inactive data records. Computing device may be any computing device referred in this disclosure, for example and with reference to FIG. 1. At step 405, method 400 includes a computing device configured to detect inactivity in a first data record of the plurality of data records over a predetermined time period as a function of a first timestamp of the first data record. Data record, as previously defined in FIG. 1, may include a user's job resume. A user, as defined in FIG. 1, may be a job seeker. The predetermined time period may be set by the user, as disclosed in FIG. 1. In some embodiments, computing device may be configured to monitor a plurality of timestamps associated with a plurality of data records stored on the immutable sequential listing, as disclosed in FIG. 1. Detecting inactivity may include noting that no activity associated with the data record has occurred over the predetermined time. In some embodiments computing device may configured to validate the timestamp at a timestamp authority, as disclosed in FIGS. 1-2.

Still referring to FIG. 4, at step 410, method 400 includes using a computing device to tag, as a function of the inactivity, the first data record as an inactive first data record. The process of tagging inactive user data may be accomplished by any process described throughout this disclosure, for example and with reference to FIGS. 1-3. At this step, computing device may be configured to transmit an electronic notification of inactivity to a remote device operated by the first user associated with the first data record, for example and with reference to FIG. 1.

Still referring to FIG. 4, at step 415, method 400 includes using computing device to process, as a function inactivity, the first data record. Processing, as disclosed in FIG. 1, may refer to adding the inactive user data to an archive list separate from the immutable sequential listing. This may occur after the lapse of the predetermined time set by the first user or a failed response from the first user after a notification of inactivity. In some cases, if the first user responds to the notification of inactivity with additional information to add to the first user record, computing device may process new data by posting a new first data record with an updated timestamp onto the immutable sequential listing. In some embodiments, computing device may be configured to receive and post new data records to the immutable sequential listing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
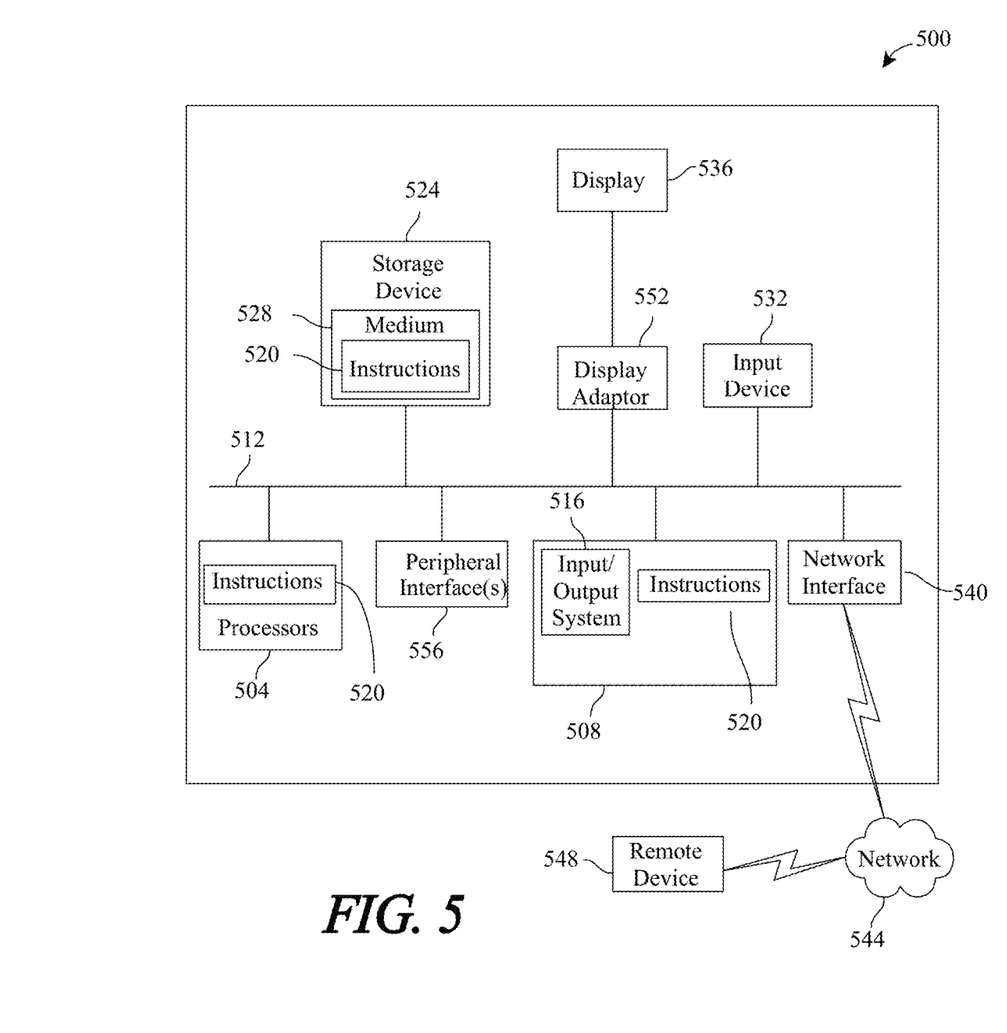
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining dormant data stored on an immutable sequential listing, the apparatus comprising:
    at least a processor; and
    a memory communicatively connected to the at least a processor, the memory containing instructions configuring the at least a processor to:
        detect inactivity in a first data record of a plurality of data records of an immutable sequential listing over a predetermined time period as a function of a first timestamp of the first data record;
        tag, as a function of the inactivity, the first data record as an inactive first data record;
        transmit a notification of the inactivity to a remote user device; and
        modify the first data record as a function of the inactivity.

2. The apparatus of claim 1, wherein modifying the first data record comprises archiving the first data record of the plurality of data records.

3. The apparatus of claim 2, wherein archiving the first data record comprises storing the first data record on a second data record of the immutable sequential listing.

4. The apparatus of claim 1, wherein modifying the first data record comprises:
    receiving an indication of continued user activity related to the first data record of the plurality of data records; and
    posting an updated first data record of the plurality of data records with an updated timestamp.

5. The apparatus of claim 1, wherein inactivity comprises no activity associated with the first data record over the predetermined time period.

6. The apparatus of claim 1, wherein tagging the first data record as the inactive first data record comprises labeling the first data record as at least "inactive".

7. The apparatus of claim 1, wherein the memory further contains instructions configuring the at least a processor to validate the first timestamp at a timestamp authority.

8. The apparatus of claim 7, wherein validating the first timestamp comprises using a secure proof.

9. The apparatus of claim 1, wherein the notification comprises a text message.

10. A method for determining dormant data stored on an immutable sequential listing, the method comprising:
    detecting, using a processor, inactivity in a first data record of a plurality of data records of an immutable sequential listing over a predetermined time period as a function of a first timestamp of the first data record;
    tagging, using the processor, the first data record as an inactive first data record as a function of the inactivity;
    transmitting a notification of the inactivity to a remote user device; and
    modifying, using the processor, the first data record as a function of the inactivity.

11. The method of claim 10, wherein modifying the first data record comprises archiving the first data record of the plurality of data records.

12. The method of claim 11, wherein archiving the first data record comprises storing the first data record on a second data record of the immutable sequential listing.

13. The method of claim 10, wherein modifying the first data record comprises:
    receiving an indication of continued user activity related to the first data record of the plurality of data records; and
    posting an updated data record of the plurality of data records with an updated timestamp.

14. The method of claim 10, wherein inactivity comprises no activity associated with the first data record over the predetermined time period.

15. The method of claim 10, wherein tagging the first data record as the inactive first data record comprises labeling the first data record as at least "inactive".

16. The method of claim 10, further comprising validating the first timestamp at a timestamp authority.

17. The method of claim 16, wherein validating the first timestamp comprises using a secure proof.

18. The method of claim 10, wherein the notification comprises a text message.

* * * * *